No. 756,918. PATENTED APR. 12, 1904.
E. C. WASHBURN.
DRAFT COUPLING FOR CARS.
APPLICATION FILED SEPT. 8, 1903.
NO MODEL. 3 SHEETS—SHEET 1.
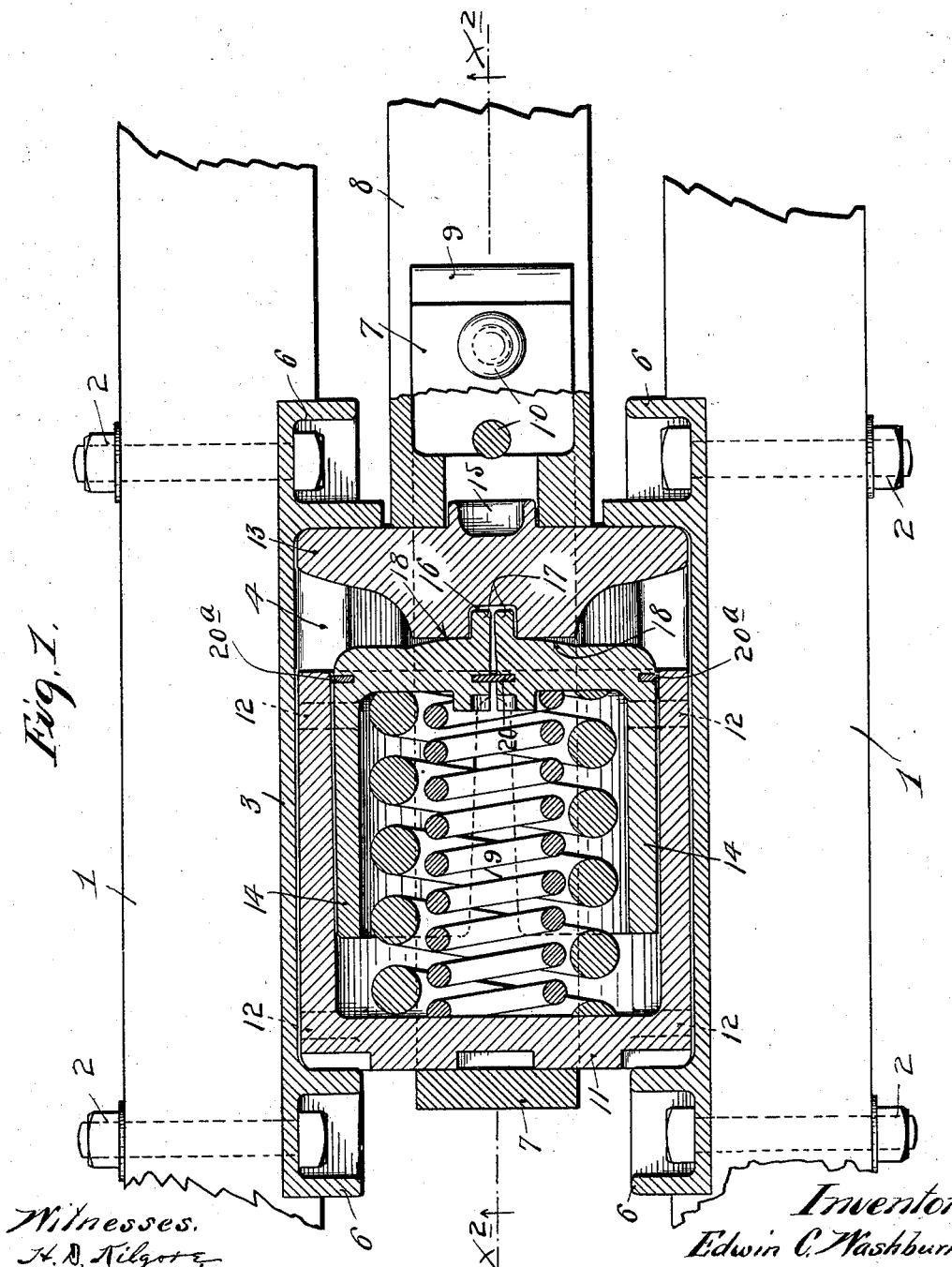

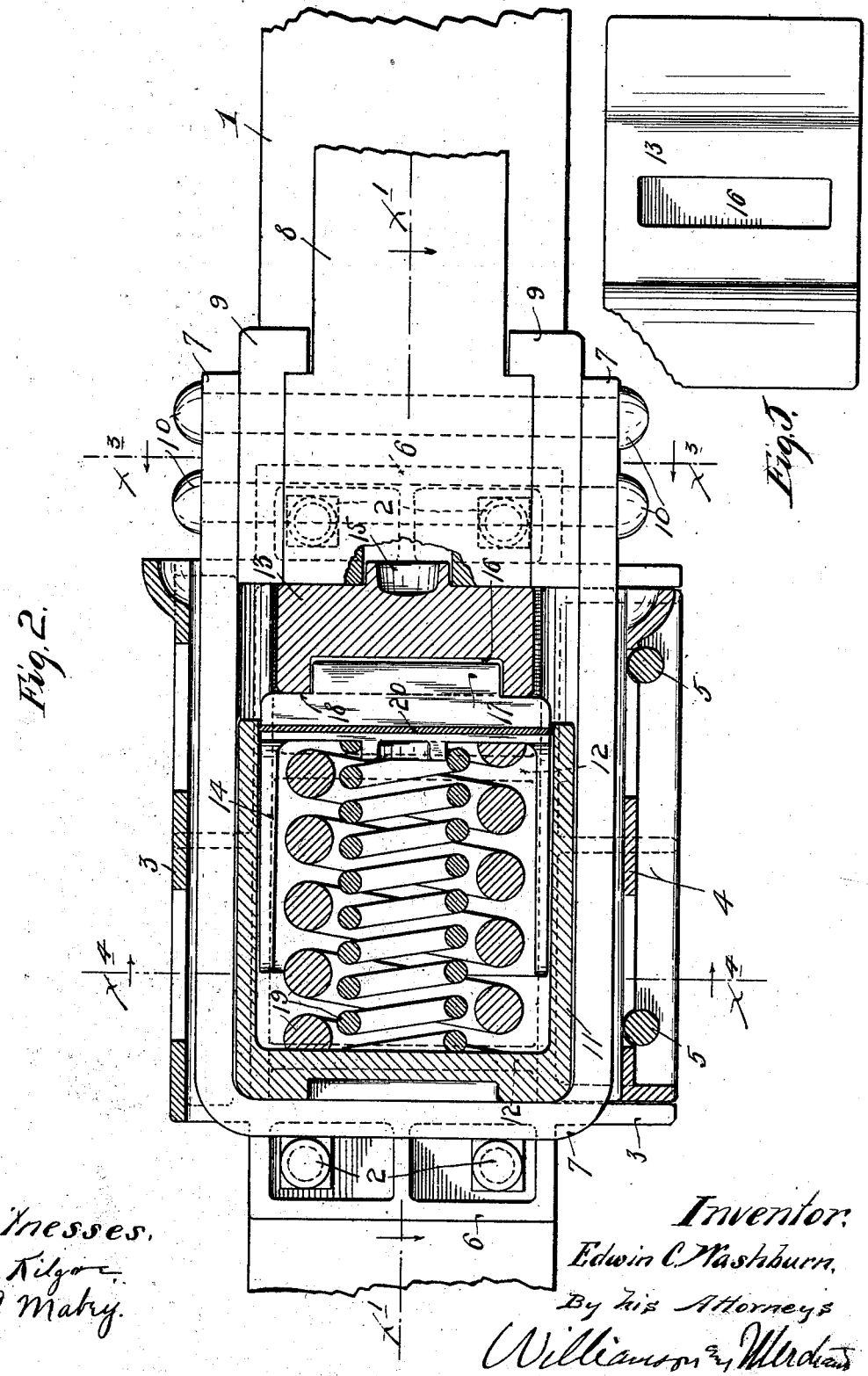

No. 756,918. PATENTED APR. 12, 1904.
E. C. WASHBURN.
DRAFT COUPLING FOR CARS.
APPLICATION FILED SEPT. 8, 1903.
NO MODEL. 3 SHEETS—SHEET 3.
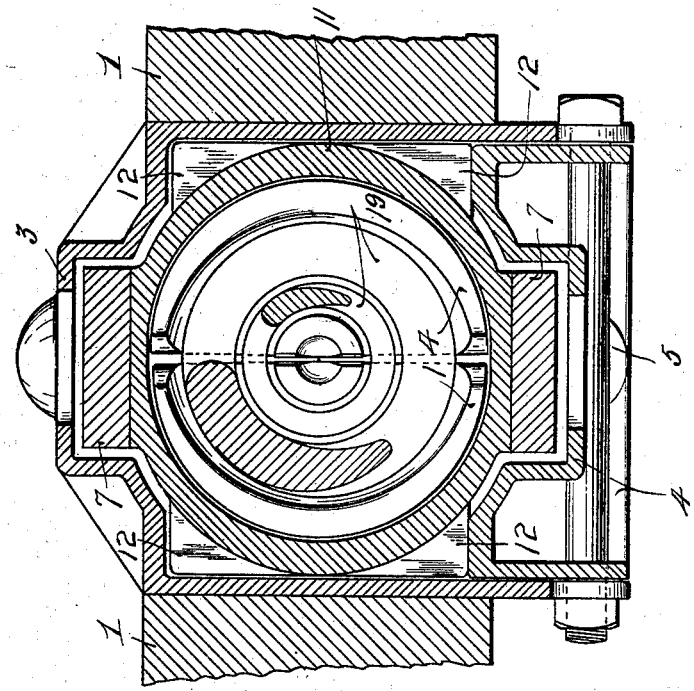
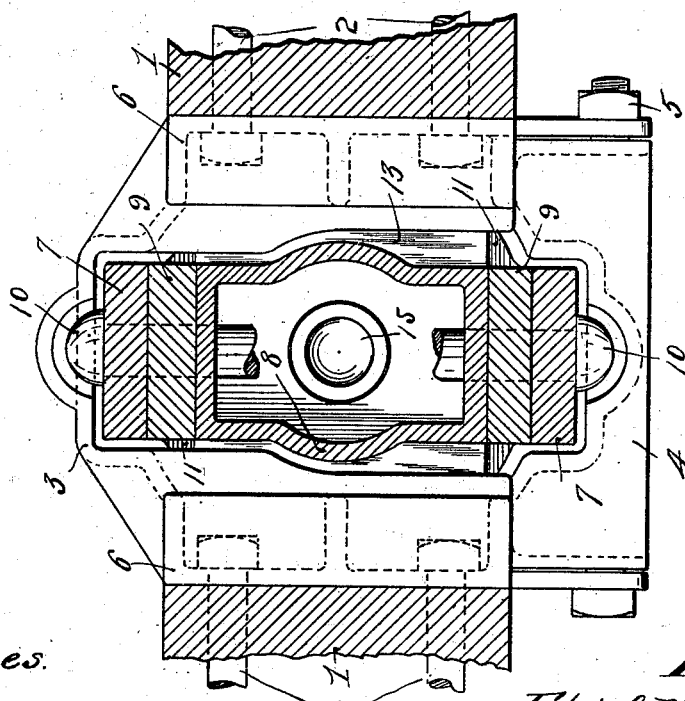
Witnesses.
H. S. Kilgore
R. C. Mabry.
Inventor.
Edwin C. Washburn.
By his Attorneys.
Williamson & Merchant No. 756,918. Patented April 12, 1904.

UNITED STATES PATENT OFFICE.

EDWIN C. WASHBURN, OF MINNEAPOLIS, MINNESOTA.

DRAFT-COUPLING FOR CARS.

SPECIFICATION forming part of Letters Patent No. 756,918, dated April 12, 1904.

Application filed September 8, 1903. Serial No. 172,260. (No model.)

*To all whom it may concern:*

Be it known that I, EDWIN C. WASHBURN, a citizen of the United States, residing at Minneapolis, in the county of Hennepin and State of Minnesota, have invented certain new and useful Improvements in Draft-Couplings for Cars; and I do hereby declare the following to be a full, clear, and exact description of the invention, such as will enable others skilled in the art to which it appertains to make and use the same.

My present invention is especially directed to the improvement of draft-rigging for cars, engines, and tenders; but certain of the features thereof are capable of a more general application.

More specifically stated, the primary object of my invention is to provide an improved frictional retarding device for relieving the draft-springs of draft-riggings from the heavy impacts or blows which are frequently delivered thereto under bumping and draft strains and especially under the former.

To the above ends the invention consists of the novel devices and combinations of devices hereinafter described, and defined in the claims.

The invention is illustrated in the accompanying drawings, wherein like characters indicate like parts throughout the several views.

Figure 1 is a horizontal section through the frictional retarding device and a part of the draft-rigging, taken on the line $x'$ $x'$ of Fig. 2. Fig. 2 is a view, partly in side elevation and partly in vertical section, on the line $x^2$ $x^2$ of Fig. 1. Fig. 3 is a transverse vertical section taken on the line $x^3$ $x^3$ of Fig. 2. Fig. 4 is a transverse vertical section taken on the line $x^4$ $x^4$ of Fig. 2, and Fig. 5 is a detail in elevation showing a portion of one of the followers.

The numeral 1 indicates the draft-timbers of the car, to which, by means of bolts 2, is rigidly secured an approximately rectangular draft-box 3, the bottom 4 of which is detachably secured thereto by means of transverse bolts 5. The side plates of the draft-box 3 at their ends terminate in abutments or so-called "draft-lugs" 6, into which, as shown, the heads of the bolts 2 are countersunk. The top of the draft-box 3 and its bottom 4 are bulged, respectively, upward and downward to form longitudinal channels, in which work the prongs of the draft yoke or stirrup 7 of the draft-bar 8. As shown, spacing-strips 9 are interposed between the ends of the yokes 7 and the shouldered inner end of the said draft-bar, the said three parts being rigidly secured together by heavy rivets 10.

The spring-pressed follower 11, which engages the transverse inner portion of the yoke 7 and the inner pair of abutments or lugs 6, is approximately cylindrical in form, but is provided with angular projections 12, that loosely fit the rectangular guideways formed within the draft-box between the abutments or draft-lugs 6, as best shown in Fig. 4, by reference to which it will be noted that the lower members of said projections 12 rest upon the side portions of the box-bottom 4. The other follower is of quite complex form, being made up of the following parts, to wit: a rectangular base member 13 and a pair of semicup-shaped members 14, which two members 14 taken together make up a split or divided cup-shaped casing that telescopes into and quite closely fits the interior of the other cup-shaped follower 11. The base member 13 at its ends fits the rectangular guideway in the sides of the draft-box and is normally pressed against the forward abutments or draft-lugs 6 and, as shown, is formed with a centrally-located boss 15, that fits a recess in that end of the draft-bar 8 against which said member 13 is normally pressed. In its rear or inner face and at its central portion the said member 13 is formed with a transversely-extended fulcrum seat or depression 16, in which are seated the fulcrum-lugs 17, formed one on each of the case or cup sections 14. The fulcrum-lugs 17 lie close together and extend diametrically across the end of the said divided cup or case, and just outward of the said lugs the said sections 14 are formed with rounded bearing-surfaces 18, that engage with the abutting flat surfaces of the base member 13. It will thus be seen that the cup or case sections 14 are so fulcrumed that a force being applied to their outer portions or upper and lower portions and this force resisted by the fulcrum-lugs 17 and base member 13 the outer cylindrical surfaces of the said members 14 will be pressed into frictional contact with the inner cylindrical surfaces of the follower or casing 11. This frictional contact between the said parts and the followers is constantly maintained to some extent by a coiled spring 19—to wit, the draft-spring of the draft-rigging—which spring, as shown, is of complex form, being made up of concentrically-arranged sections. The two cup-like followers or members telescope under such close engagement that leakage of air will be slow, except through the opening left between the sections 14, and to close this opening against the free passage of air a packing-strip 20 is set into grooves formed in the adjacent head portions of the said members 14, and an annular packing 20ᵃ is set into the peripheral portion thereof in line with said strip 20. In this way the telescoping parts are made to so closely fit and are so nearly air-tight that they will have the effect of producing a cushion by the compression of air confined within the same under bumping and draft strains. Furthermore, this compression of confined air has the effect of throwing the sections 14 into frictional contact with the member 11 under a pressure which is proportional to the draft or bumping strain. It is therefore evident that the confined air supplements the action of the spring and coöperates both with the spring and the frictionally-engaging surfaces to retard the movements of the draft-bar under both draft and bumping strains. By making the interior of the casing or follower 11 flare slightly toward its open end an increased frictional contact between the same and the members 14 is afforded.

By reference to Fig. 4 it will be seen that the side walls of the frictionally-engaging members 11 and 14 are thickened up or made slightly crescent shape in cross-section. This construction is important because of the fact that said parts wear most rapidly at these thickened portions, and hence if not thus formed will in time wear away the walls to such an extent that they would be materially weakened. It will be further noted by reference particularly to Fig. 1 that the end-forming portions of the members 14 are provided with semicircular hub portions 21, which serve to hold the spring 19 in a central position.

From what has been said it will of course be understood that the device described is capable of many modifications within the scope of my invention as herein set forth and claimed.

What I claim, and desire to secure by Letters Patent of the United States, is as follows:

1. A frictional spring-retarding device, comprising a pair of telescoping members, with a spring compressed between them, one of the said telescoping members being split or divided, and having adjacent lugs, and a base member having a seat, receiving the said lugs, substantially as described.

2. A frictional retarding device, comprising a pair of telescoping parts, one of which parts is split or divided and fulcrumed for contact with the other member, and packings forming substantially air-tight joints between the sections of said divided member, and between said divided member and the coöperating frictional member, whereby the said telescoping members afford an air-cushion.

3. A frictional spring-retarding device, comprising a pair of cup-like telescoping members, one of which has a radial movement, for frictional engagement with the other member, and forms tight joints therewith, whereby an air-cushion is afforded, and a spring inclosed within and pressed between the said telescoping members, substantially as described.

4. The combination with the telescoping cup-shaped members, one of which is split or divided, and has adjacent fulcrum-lugs 17, of a base member 13 having the seat 16 receiving said fulcrum-lugs 17, and a coiled spring contained within and compressed between the said cup-shaped members, substantially as described.

5. The combination with a draft-box having abutments, and a draft-bar having a draft-yoke, of a cup-shaped follower 11, having the angular projections engageable with said draft-box and the inner abutments thereof, the divided or split cup-shaped frictional member 14 telescoping into said member 11 and provided with the fulcrum-lugs 17, the base member 13 coöperating with the outer abutments of said draft-box, and having the seat 16 receiving said fulcrum-lugs 17, and the spring compressed within said telescoping members 11 and 14 and pressing the sections of the latter into frictional engagement with the former, the said members 11, 13 and 14 being embraced by the yoke of said draft-bar, substantially as described.

In testimony whereof I affix my signature in presence of two witnesses.

EDWIN C. WASHBURN.

Witnesses:
ELIZABETH H. KELIHER,
F. D. MERCHANT.